(12) United States Patent
Hirsch et al.

(10) Patent No.: US 9,738,995 B2
(45) Date of Patent: Aug. 22, 2017

(54) AIR-BAG FABRICS

(71) Applicant: AUTOLIV DEVELOPMENT AB, Vårgårda (SE)

(72) Inventors: Brita Hirsch, Macclesfield (GB); Hugh Finn, Warrington (GB)

(73) Assignee: AUTOLIV DEVELOPMENT AB, Vargarda (SE)

( * ) Notice: Subject to any disclaimer, the term of this patent is extended or adjusted under 35 U.S.C. 154(b) by 435 days.

(21) Appl. No.: 14/359,003

(22) PCT Filed: Nov. 14, 2012

(86) PCT No.: PCT/SE2012/051257
§ 371 (c)(1),
(2) Date: May 16, 2014

(87) PCT Pub. No.: WO2013/077798
PCT Pub. Date: May 30, 2013

(65) Prior Publication Data
US 2014/0329037 A1    Nov. 6, 2014

(30) Foreign Application Priority Data

Nov. 24, 2011 (EP) ................................. 11190625

(51) Int. Cl.
*D03D 1/02* (2006.01)
*B60R 21/235* (2006.01)
*D01F 6/62* (2006.01)
*D03D 15/00* (2006.01)

(52) U.S. Cl.
CPC ............. *D03D 1/02* (2013.01); *B60R 21/235* (2013.01); *D01F 6/62* (2013.01); *D03D 15/00* (2013.01); *B60R 2021/23509* (2013.01); *B60R 2021/23514* (2013.01); *D10B 2331/04* (2013.01); *Y10T 428/1345* (2015.01); *Y10T 428/249921* (2015.04); *Y10T 442/2861* (2015.04)

(58) Field of Classification Search
CPC ..... Y10T 442/2861; Y10T 428/249921; Y10T 428/1345; D10B 2331/04; B60R 21/235; B60R 2021/23509
USPC .............. 280/728.1; 442/164; 428/35.5, 221
See application file for complete search history.

(56) References Cited

U.S. PATENT DOCUMENTS

| | | |
|---|---|---|
| 2008/0014816 A1 | 1/2008 | Schmitt et al. |
| 2011/0316259 A1 | 12/2011 | Ritter |
| 2012/0235391 A1* | 9/2012 | Obara .................. B60R 21/232 280/730.2 |
| 2013/0106085 A1* | 5/2013 | Kismir et al. ............. 280/743.1 |

(Continued)

FOREIGN PATENT DOCUMENTS

| | | |
|---|---|---|
| DE | 102009009905 A1 | 8/2010 |
| WO | WO-2012/047785 A2 | 4/2012 |

OTHER PUBLICATIONS

International Search Report and Written Opinion for PCT/SE2012/051257, ISA/SE, Stockholm, dated Feb. 22, 2013.

*Primary Examiner* — Arti Singh-Pandey
(74) *Attorney, Agent, or Firm* — Stephen T. Olson; Harness, Dickey & Pierce, P.L.C.

(57) ABSTRACT

A fabric for a seam region of an inflatable air-bag includes fibers formed from polyester and having an elongation at break of around 12% to 20%. The fabric also has an instantaneous thermal creep above 0.5% at 100° C.

17 Claims, 1 Drawing Sheet

(56) References Cited

U.S. PATENT DOCUMENTS

2013/0295301 A1* 11/2013 Schmitt et al. ................ 428/12
2014/0021705 A1* 1/2014 Youn et al. ................ 280/730.1

* cited by examiner

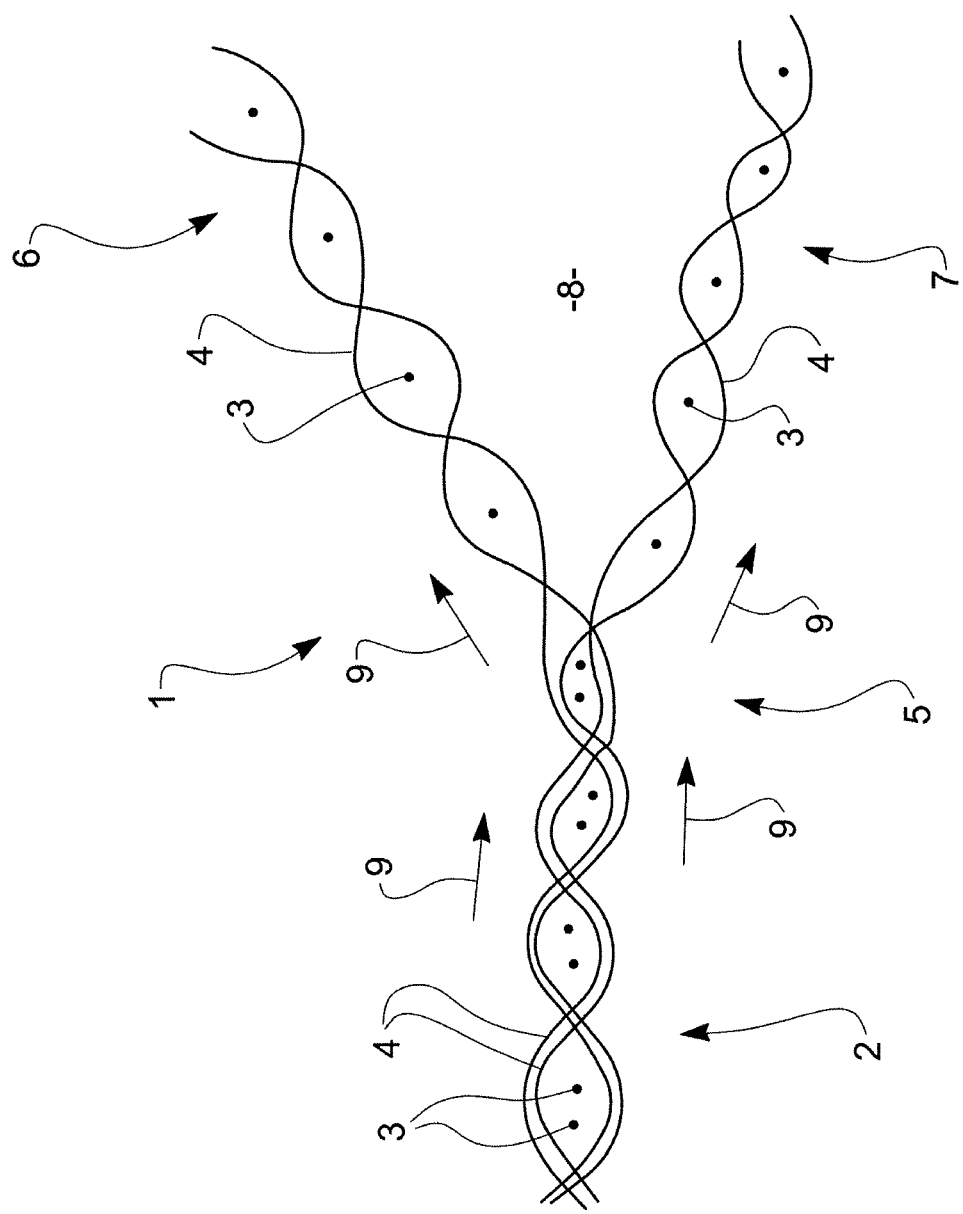

AIR-BAG FABRICS

CROSS-REFERENCE TO RELATED APPLICATIONS

This application is a 371 U.S. National Stage of International Application No. PCT/SE2012/051257, filed Nov. 14, 2012, which claims priority to European Patent Application No. EP 11190625.1, filed Nov. 24, 2011. The disclosures of the above applications are incorporated herein by reference.

FIELD

THIS INVENTION relates to air-bag fabrics, and in particular to fabrics which are adapted to resist rupturing of an air-bag under inflation conditions.

BACKGROUND

Currently vehicle air-bags are generally formed from woven nylon fabric. Nylon (along with other polyamides) has been used in the manufacture of air-bags (and in a large number of other applications) for many years, and its properties are well-understood.

In recent years, however, there has been a drive to use materials other than nylon, in particular for reasons of cost and environmental impact. It is preferred, if possible, to use polyester (or similar materials) in the manufacture of air-bags. This switching of materials does, however, present challenges, as it is often not straightforward to manufacture air-bags having advantageous properties to match those made using nylon.

SUMMARY

It is an object of the present invention to provide an improved air-bag fabric, and resulting air-bag.

Accordingly, one aspect of the present invention provides a fabric for a seam region of an inflatable air-bag, the fabric comprising fibres formed from polyester and having an elongation at break of around 12% to 20%, and also having an instantaneous thermal creep above 0.5% at 100° C.

Advantageously, the elongation at break of the fibres is between 16% and 20%.

Preferably, the elongation at break of the fibres is around 18%.

Conveniently, the instantaneous thermal creep of the fibres is between around 1.19 and 3.09% at 100° C.

Advantageously, the instantaneous thermal creep of the fibres is around 1.9% at 100° C.

Preferably, the tenacity of the fibres is at least 700 mN/tex.

Conveniently, the tenacity of the fibres is at least 770 mN/tex.

Advantageously, the fabric is at least partially coated with a coating that reduces the permeability of the fabric.

Alternatively, the fabric is completely or substantially uncoated.

Another aspect of the present invention provides an air-bag comprising the fabric of any of the above.

Advantageously, the fabric is used in a seam region of the air-bag.

Preferably, a different fabric is used in at least one other region of the air-bag.

Conveniently, the at least one other fabric comprises fibres having a lower value of instantaneous thermal creep at 100° C. than the fibres of the fabric forming the seam region.

Advantageously, the air-bag is a one piece woven air-bag.

DESCRIPTION OF THE DRAWING

In order that the present invention may be more readily understood, embodiments thereof will now be described, by way of example, with reference to accompanying FIG. 1, which shows a schematic side-view of a region of an air-bag constructed in accordance with the present invention.

DETAILED DESCRIPTION

Referring to FIG. 1, a schematic view is shown of the seam of an air-bag 1. In the depicted embodiment the air-bag 1 is a one piece woven (OPW) air-bag, although a skilled person will understand that the present invention is not limited to air-bags of this type.

In a first, closed portion 2 of the air-bag 1, the fabric of the air-bag 1 is formed from warp yarns 3 and weft yarns 4. As will be understood by those skilled in the art, the warp yarns 3 and weft yarns 4 are arranged substantially at right angles to one another and woven together so that, as each warp yarn 3 is followed through the fabric, it passes alternately under and over successive weft yarns 4 that it encounters. Similarly, as a weft yarn 4 is followed through the fabric, it passes alternately under and over successive warp yarns 3 that it encounters.

In the first, closed region 2 of the air-bag 1, the fabric is formed from double strands of warp and weft yarns 3,4.

At a seam region 5 of the air-bag 1, the two sets of warp and weft yarn 3,4 part from one another, and separate to form an upper layer 6 and a lower layer 7, each composed of single sets of the warp and weft yarns 3,4, interwoven as described above. Between the upper and lower layers 6,7 an internal cavity 8 is created, and this forms an inflatable region of the air-bag 1. The skilled person will understand that the air-bag 1 may contain several such internal cavities defining respective inflatable regions, which may be interconnected with one another or may be independently connected to an inflator (not shown).

Prior to inflation of the air-bag 1, the upper and lower layers 6 are likely to lie flat against one another, and the air-bag 1 will also be rolled and/or folded in order to fit into an air-bag module in a compact and unobtrusive fashion. During deployment of the air-bag, hot gas will be introduced rapidly into the cavity 8, thus expanding this cavity 8 rapidly and separating the upper and lower layers 6,7 from one another as the air-bag 1 is inflated and deployed.

It will be understood that, as this inflation occurs, the fabric from which the air-bag 1 is formed will be placed under significant tensile forces, for instance in the directions indicated by the arrows 9 in FIG. 1.

As this occurs, the yarns 3,4 of the fabric, and in particular the weft yarns 4 (in the arrangement as seen in FIG. 1) of the upper and lower layers 6,7 will be pulled towards the seam 5. As this occurs the yarns 3,4 will elongate, and become thinner. This can lead to gaps between the yarns 3,4 at the seam 5, which can lead to uncontrolled loss of gas from the air-bag 1 at the seam (particularly if any coating of the air-bag 1 is breached), potentially leading to failure of the air-bag. This phenomenon is some times known as "combing" or "seam combing".

In general, it is desired to avoid significant combing during deployment of an air-bag. The use of fibres which are irregular in cross-section, for instance embossed, can prevent combing to some extent. However, combing cannot be completely eliminated using this technique.

Yarns used in the manufacture of air-bags have various mechanical properties. These include elongation at break (or simply "elongation") which is expressed as the percentage increase in length of a yarn, when it is placed under tension, at the point where the yarn breaks.

Another important property of such yarns is tenacity, which is usually expressed in cN/tex or mN/tex. Tenacity relates to the maximum load that a yarn can be placed under before it ruptures.

A further important property is instantaneous thermal creep. As those skilled in the art will understand, when exposed to high temperatures a polyester fibre will become longer and thinner when heated under tension (compared to the situation where the fibre is placed under tension without heating).

To determine the instantaneous thermal creep, a thermal mechanical analyser was used to record the change in length of the fibres under a controlled heating rate. One suitable analyser is TA Instruments model 2940. A number of fibres were selected at random from a yarn, and combined into a bundle with a decitex of about 65. This bundle was then mounted in the analyser, using a sample length of about 10 mm. and loaded to give a stress on the bundle of about 8.83 cN/tex. The bundle was heated at 133.3° C./min, to a temperature of 100° C. The increase in length of the bundle was recorded when the temperature reached 100° C. The instantaneous thermal creep at 100° C. is then defined as the increase in length as a percentage of the initial length. The skilled person will readily understand how the instantaneous thermal creep at temperatures other than 100° C. may be determined.

In preferred embodiments of the present invention, a fabric of which the air-bag 1 is formed, or at least the fabric comprising a seam region 3 of the air-bag 1, is formed from polyester fibre, or fibres formed from a similar material, having an elongation at break of around 12% to 20%. More preferably the elongation at break is around 16% to 20%. Most preferably the elongation at break is around 18%.

It will be understood that a fabric having a low figure for elongation at break reaches its elastic limit rapidly, and this does not necessarily indicate that the fibre is of great strength.

It has been found that fibres having an elongation at break below 12% are less favourable, since energy is absorbed, and work done, to elongate the fibres, and so a certain amount of elongation is desirable when the fabric is placed under high forces.

However, the use of fibres having a low value for elongation at break confer the advantage that the coating that is applied to the fabric is placed under less tension, and therefore a smaller amount of coating (or even no coating at all) is required to prevent significant gas leakage, and hence maintain the pressure in the air-bag. This in turn can reduce the cost and weight of the air-bag, and may allow the use of a smaller (and hence lighter and cheaper) inflator.

The above figures for elongation were obtained according to ASTM885, where individual fibres were subjected to an increasing linear extensive force and the maximum force when the fibres broke was recorded.

If a coating is used, the coating is preferably of a type that will reduce the permeability of the fabric, such as a silicone- or polyurethane-based coating. The coating may be applied through application techniques such as passing the fabric through a tank of the coating material, or spraying the coating material onto the fabric. Alternatively, the coating material may be provided as a film which is laminated onto the fabric.

The coating may be provided over all or substantially all of the fabric. Alternatively, the fabric may be coated only in one or more seam regions 3 of the air-bag 1, or in all of the seam regions 3.

In preferred embodiments of the invention the fabric from which the air-bag is formed (or at least the fabric from which a seam region of the air-bag is formed) is formed from fibres having a thermal creep of above 0.5% at 100° C. More preferably, the thermal creep of the fabric is between around 1.19 and 3.09% at 100° C., and most preferably is around 1.9% at 100° C.

It has been found that fibres having relatively low elongation at break, and low thermal creep, are generally good for ambient conditions. If, however, the air-bag is in hot conditions, for instance in desert conditions, or under the roof line of a hot vehicle, the fabric of the air-bag may be subject to thermal creep prior to inflation. However, under such conditions, the inflator of the air-bag will also be hot, and so will produce gas under higher pressure. Under these conditions, the use of fabric having a relatively high thermal creep is likely to allow a relatively small amount of additional seam leakage, which will be advantageous as this will help to prevent over-pressure situations occurring due to the fact that the inflator is at an elevated temperature.

A problem addressed by the fabrics disclosed herein is therefore that of providing a fabric for an air-bag that performs well in ambient temperatures, but is less likely to fail in very hot conditions.

There has, in the field of air-bag production, been a prejudice against the use of fibres having a relatively high instantaneous thermal creep. However, the inventors have found that, surprisingly, the use of fibres having an instantaneous thermal creep above 0.5% at 100° C. confers benefits regarding the performance of the air-bag in hot conditions.

Preferably, the fibres from which the air-bag is formed have tenacities above 700 mN/tex, and more preferably above 770 mN/tex.

In some embodiments of the invention the fabric from which the entire air-bag 1 is produced is formed using fibres having the properties set out above. In further embodiments, the fabric comprising at least one seam of the air-bag is formed from fibres having these properties, while fabric forming other regions of the air-bag is formed from fibres having different properties. For instance, at least one region of the air-bag away from a seam (for instance a region of a panel which encloses the inflatable portion of the air-bag 1, or a region of the closed, double-thickness part 2 of the air-bag 1) is formed from fibres having different properties. For instance, the fibres forming the one or more other regions may have a lower value for thermal creep and/or a lower or higher elongation at break property.

This use of different fibres may be achieved, for example, by introducing different types of warp and/or weft fibres 3,4 during the process of weaving the air-bag 1. With reference to FIG. 1, for example, as the closed region 2 of the air-bag 1 is woven, a first type of warp fibre 3 with a relatively low thermal elongation may be used in the weaving process. As the seam region 5 is woven, a second type of warp fibre 3 may then be introduced into the weaving process, having a relatively high value for instantaneous thermal creep. Once the weaving of the seam region 5 is complete and the weaving of the upper and lower layers 6,7 commences, the first type of warp fibre 3 may again be used (or indeed, a third, different type of warp fibre 3 may be introduced).

It will be understood that embodiments of the present invention may provide an improved fabric for an air-bag, which will demonstrate advantageous properties under inflation, particularly under inflation in hot environments.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An airbag comprising:
a fabric defining a closed region, an open region and a seam region there between, the fabric including a plurality of warp yarns and a plurality of weft yarns, the closed region formed from double strands of both warp and weft yarns, the open region including an upper layer and a lower layer defining an inflatable region there between, the upper and lower layers both formed from single strands of weft yarns and warp yarns,
wherein the warp yarns of the closed region include a first type of warp fibre and the warp yarns of the seam region include a second type of warp fibre, the first type of warp fibre having a lower thermal elongation, the second type of warp fibre having a greater instantaneous creep valve.

2. The airbag of claim 1 wherein at least the seam region of the fabric is formed of polyester fibres having an elongation at break of around 12% to 2%, and also having an instantaneous thermal creep above 0.5% at 100° C.

3. The airbag of claim 1, wherein the warp yarns of the open region include a third type of warp fibre, the third type of warp fibre being different from the second type of warp fibre.

4. The airbag of claim 3, wherein the third type of warp fibre is different from the first type of warp fibre.

5. An airbag comprising:
a fabric defining a seam region; and
at least the seam region including a plurality of first fibres formed from polyester and having an elongation at break no greater than around 20%, and also having a tenacity of at least 700mN/tex,
wherein the fabric further defines a closed region and an open region, the seam region between the closed and open regions, the fabric including a plurality of warp yarns and a plurality of weft yarns, the closed region formed from double strands of both warp and weft yarns, the open region including an upper layer and a lower layer defining an inflatable region there between, the upper and lower layers both formed from single strands of weft yarns and warp yarns, the fabric of the seam region transitions from the double strands of warp and weft yarns to the single strands of warp and weft yarns.

6. The airbag according to claim 5, wherein an elongation at break of the first fibres is between 16% and 20%.

7. The airbag according to claim 6, wherein the elongation at break of the first fibres is around 18%.

8. The airbag according to claim 5, wherein an instantaneous thermal creep of the first fibres is between around 1.19 and 3.09% at 100° C.

9. The airbag according to claim 5, wherein an instantaneous thermal creep of the first fibres is around 1.9% at 100° C.

10. The airbag according to claim 5, further comprising a coating at least partially coating the fabric, the coating reducing a permeability of the fabric.

11. The airbag according to claim 5, wherein the fabric is completely or substantially uncoated.

12. The airbag according to claim 5, wherein an entirety of the fabric is formed from the first fibres.

13. The airbag according to claim 5, wherein at least the seam region is formed of the first fibres.

14. The airbag according to claim 12, wherein the fabric includes a plurality of second fibres forming at least one of the closed region and the open region, the second fibres having different properties as compared to the first fibres.

15. The airbag according to claim 14, wherein the second fibres have a lower value of instantaneous thermal creep at 100° C. than the first fibres.

16. An airbag comprising:
a fabric defining a closed region, an open region, and a seam region there between, the fabric including a plurality of first fibres and a plurality of second fibres, the first fibres formed from polyester and having an elongation at break of around 12% to 20%, and also having an instantaneous thermal creep above 0.5% at 100° C., the second fibres having a different instantaneous thermal creep as compared to the first fibres,
wherein at least the seam region is formed of the first fibres, and wherein the fabric includes a plurality of warp yarns and a plurality of weft yarns, the closed region formed from double strands of both warp and weft yarns, the open region including an upper layer and a lower layer defining an inflatable region there between, the upper and lower layers both formed from single sets of weft yarns and warp yarns.

17. The airbag according to claim 16, wherein the second fibres have a lower value of instantaneous thermal creep at 100° C. than the first fibres.

* * * * *